United States Patent [19]

Nuyts et al.

[11] Patent Number: 5,171,123
[45] Date of Patent: Dec. 15, 1992

[54] LOAD LIFTING DEVICE ON A TRUCK

[76] Inventors: Karolus M. L. Nuyts, Steenweg op Mol 175; Henry C. Nuyts, Steenweg op Mol 173,, both of 2360 Oud-Turnhout, Belgium

[21] Appl. No.: 681,690

[22] Filed: Apr. 8, 1991

[51] Int. Cl.⁵ .............................................. B60P 1/46
[52] U.S. Cl. ..................................... 414/540; 414/672
[58] Field of Search ............... 414/540, 541, 545, 921, 414/679

[56] References Cited

U.S. PATENT DOCUMENTS

| | | | |
|---|---|---|---|
| 3,651,965 | 3/1972 | Simonelli et al. | 414/540 |
| 3,791,541 | 2/1974 | Himes | 414/545 |
| 3,795,329 | 3/1974 | Martin et al. | 414/545 |
| 4,124,097 | 11/1978 | Hawks et al. | 414/540 X |
| 4,576,541 | 3/1986 | Dunn et al. | 414/545 |
| 5,040,936 | 8/1991 | Rhea | 414/540 |

FOREIGN PATENT DOCUMENTS

| | | | |
|---|---|---|---|
| 64304 | 11/1982 | European Pat. Off. | 414/540 |
| 0373702 | 6/1990 | European Pat. Off. | |
| 1395365 | 5/1964 | France | 414/545 |
| 8100888 | 9/1982 | Netherlands | 414/545 |
| 2040866 | 9/1980 | United Kingdom . | |

Primary Examiner—David A. Bucci
Assistant Examiner—Robert S. Katz
Attorney, Agent, or Firm—Foley & Lardner

[57] ABSTRACT

Load lifting device in particular for a truck, the device comprising: a pair of substantially upright columns (6) which can be in a stationary position in respect of the truck; a slide (7) being movable along the columns; a platform assembly (12) being mounted to the slide such that it can be pivoted around an axis (10) running parallel to the plane of the columns and perpendicular to the longitudinal direction of these, members being present for moving the slide in respect of the columns, the platform assembly (12) comprising two sections: a base section (11) being pivotally mounted to the slide (7) and a carrying section (14) being pivotally mounted to the base section (11).

13 Claims, 4 Drawing Sheets

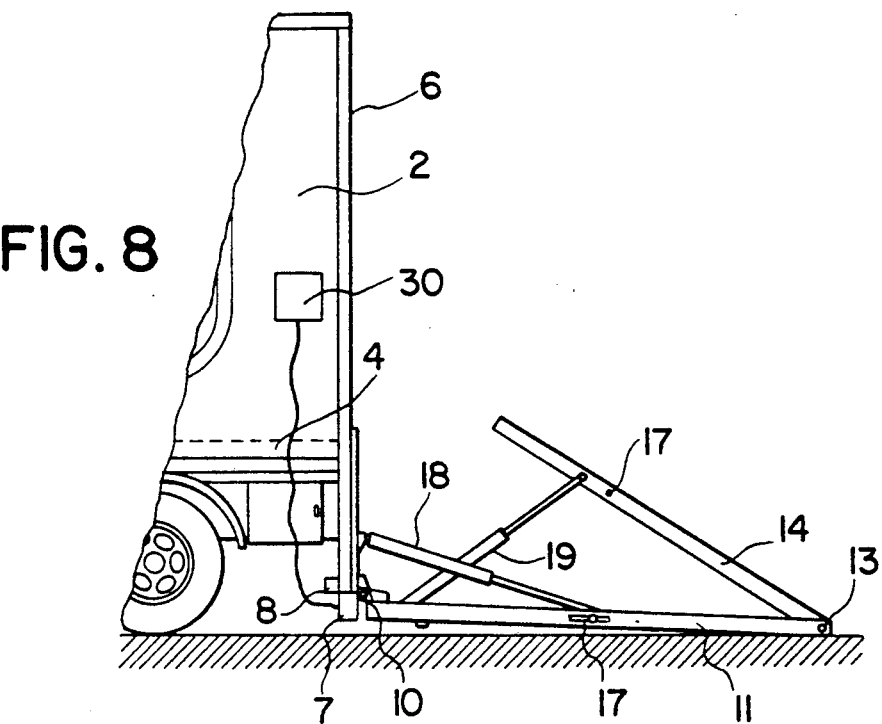
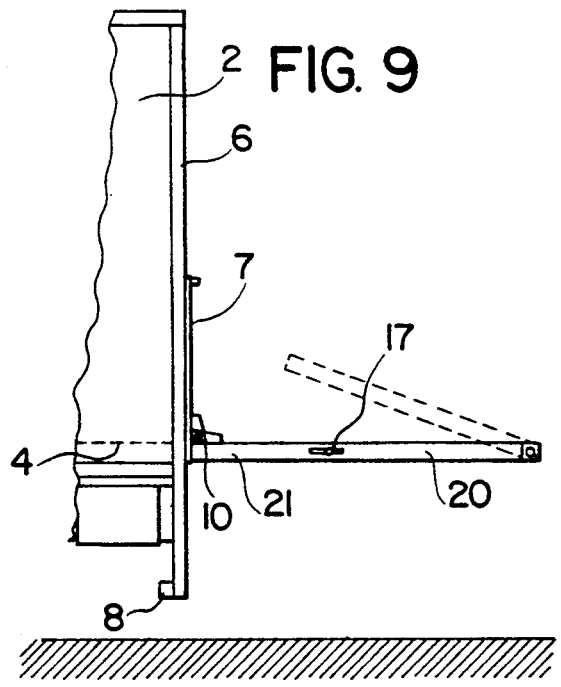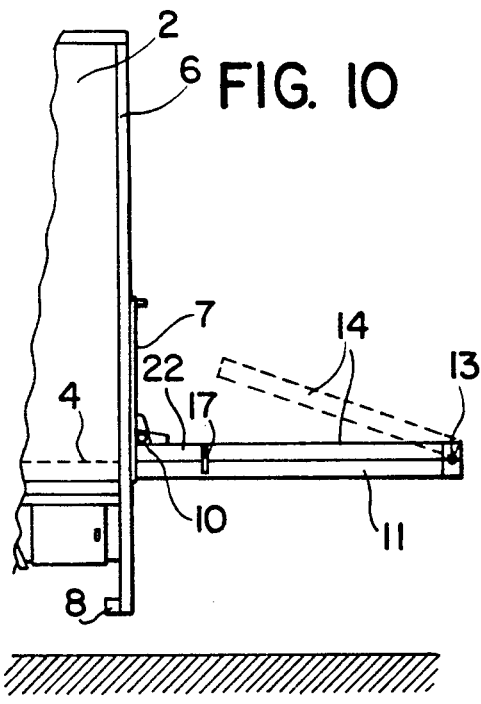

LOAD LIFTING DEVICE ON A TRUCK

BACKGROUND OF THE INVENTION

1. Field of the Invention

The invention relates to a load lifting device for a truck, having a pair of substantially upright columns which are in a stationary position with respect to the body of the truck; a slide which is movable along the columns; a platform which is mounted to the slide such that it can be pivoted with respect to the slide around an axis which runs parallel to the plane defined between the columns and perpendicular to the longitudinal direction of the columns; and means for moving the slide with respect to the columns.

2. Description of the Related Art

Such a load lifting device is reflected in EP-A-0 373 702. In this known device, the platform is mounted to the lower end of the slide so that the platform can be lowered to the ground on which the related truck is standing. By this, however, the height up to which the platform can be raised is limited.

SUMMARY OF THE INVENTION

The invention aims to overcome the above disadvantage and does so by providing a platform having two sections: a base section which is pivotally mounted to the slide, and a carrying section which is pivotally mounted to the base section. The pivot axis between the base section and the carrying section runs parallel to and is spaced from the pivot axis between the base section and slide, such that when the device is used at least a part of the carrying section is directed from the pivot axis between the base section and the carrying section towards the upright columns of the device. A means for adjusting and blocking, both sections in a desired position with respect to the slide is also provided.

By the embodiment of the platform described above, it is possible to pivot the base section such that it extends obliquely upwardly from the pivot axis between the base section and the slide, while the carrying section is in its horizontal position such that it may carry a load.

Obviously the supporting surface of the carrying section can be brought to a considerable distance above the lowest point of the slide such that the load can be delivered to a much higher point than in case of the known device.

According to another embodiment, the base section and the carrying section, as seen in a direction perpendicular to the pivot axes, are dimensioned such that when the base section is obliquely running upwardly from the slide and the carrying section is in its horizontal position, the free edge of the latter, which runs parallel to its pivot axis, will be present near the slide.

In this way, the carrying section is closely positioned near the cargo-supporting surface of the cargo space of the truck, so that the cargo can easily be brought onto the carrying section.

Nevertheless, it is also possible that the dimensions of the base section and the carrying section, in the above mentioned direction, are substantially equal. In such a case, the free edge of the carrying section may extend between the columns of the device and into the cargo space when the base section is obliquely running upwardly from the slide. When the device is used, the angle between the base section and the columns may be between 75° and 45°.

A simple locking of the carrying section in the horizontal position, when the base section is obliquely running upwardly from the slide, can be obtained by releasably fixing the free edge of the carrying section to the slide.

In this way a very stable positioning of the carrying section is obtained. The device is thus particularly suitable for bringing cargo from the supporting surface of the cargo space of the truck onto the carrying section, and moving the cargo upwardly by moving the slide.

In one embodiment, it is possible to bring the base section and the carrying section manually into the desired position after which the connection between the carrying section and the slide is effected.

When the device is no longer needed, the connection between the carrying section and the slide is released, and the base section is moved to its horizontal position with the carrying section positioned on it. Subsequently, the system is brought to its vertical position when the truck has to be moved.

Obviously, the system of base section and carrying section may form the door of the rear wall of the truck as this is known per se.

Preferably, the carrying section can be positioned such that it is lying in the same plane as the base section, in which case the base section will mainly consist of two spaced beams extending perpendicular to the pivot axes. The beams are connected to each other by means such as the slide.

When, however, the length of the carrying section, as seen in a direction perpendicular to its pivot axis, is smaller than the length of the base section, a plate shaped element is provided between the beams, near the slide, for bridging the distance between the free edge of the carrying section and the slide. The plate-shaped element then serves as stiffening element for the base section.

The possibility further exists that the pivot axis between the base section and the carrying section is spaced from both free edges of the carrying section, the free edges running parallel to the pivot axis of said carrying section. Thus, for example, when the base section and the carrying section are both in the horizontal position, the carrying section will extend beyond the pivot axis between both sections as seen from the rear of the truck.

In most cases it is preferred that the pivoting of the base section and the carrying section be obtained by mechanically, pneumatically, hydraulically or electrically operated means. Such means normally will have to be used for moving the slide and the platform upward.

It is also possible to provide control means for controlling the position of the carrying section such that the cargo-supporting surface remains horizontal during the pivoting of the base section.

Now the invention is described by means of embodiments shown in the drawing, in which:

FIG. 8 shows a side view according to the FIGS. 6 and 7, but with the platform sections in another position;

FIG. 9 shows a side view according to FIG. 3 but with the platform sections shown in more detail;

FIG. 10 shows a side view according to FIG. 9 reflecting a second embodiment of the platform sections.

Figure 1:
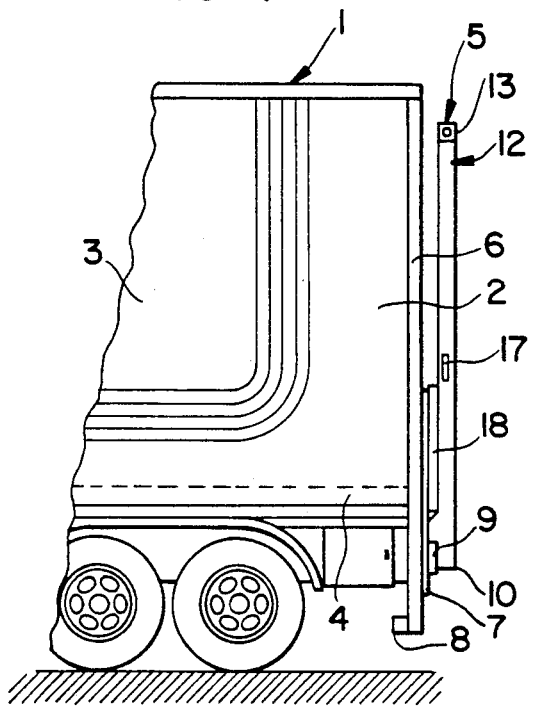
FIG. 1 shows part of a side view of a truck provided with a load lifting device according to the present invention in the non-use position.

In the figures, a part of truck 1 is shown comprising the body 2 defining the cargo space 3 with its supporting surface or floor 4.

On the rear side of the truck 1 a load lifting device 5 according to the invention is mounted. Said load lifting device comprises two upright columns 6 along which a slide 7 which can be moved in a vertical direction. The columns 6 can be fixedly mounted to the body 2 and to the rear bumper 8 of the truck, but of course it is possible that the columns are mutually connected to each other to obtain an assembly that is movable such as that which is described in the above mentioned European patent application.

The slide 7 is of a construction known per se and so is not described in detail. Conventional means 30 for moving the slide 7 upwardly and downwardly along the columns 6 are also provided.

The slide 7 is provided with lugs 9 for supporting a pivot shaft 10 forming the pivot axis between the slide and a base section 11 of the platform assembly 12. The base section 11 supports a shaft 13 which in its turn supports the carrying section 14 of the platform assembly 12.

Figure 3:
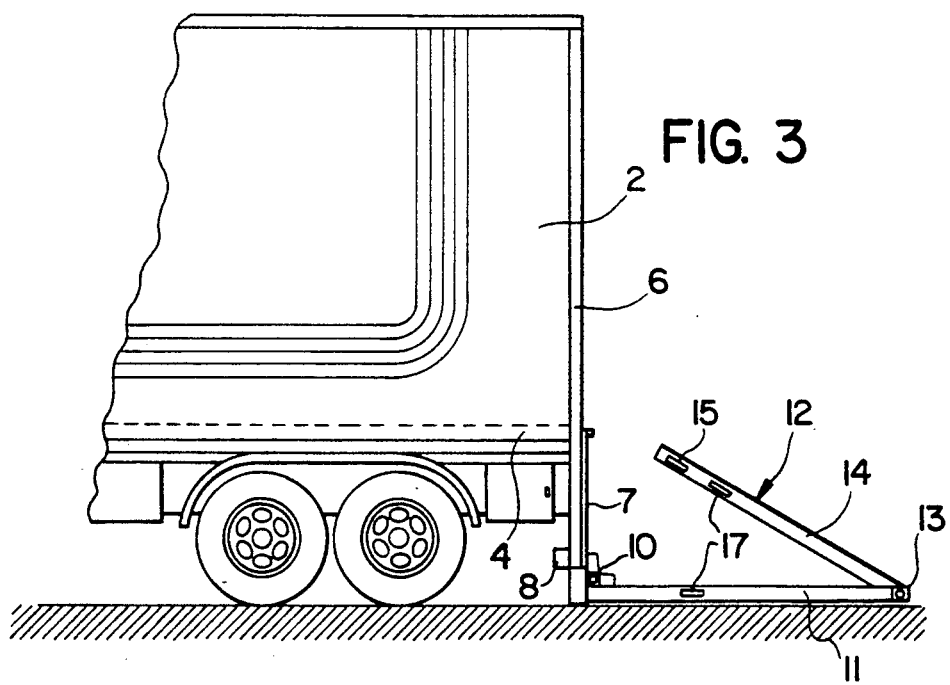
FIG. 3 shows a side view according to FIG. 1 of a first embodiment of the device when the device is brought into the operative condition.
Figure 4:
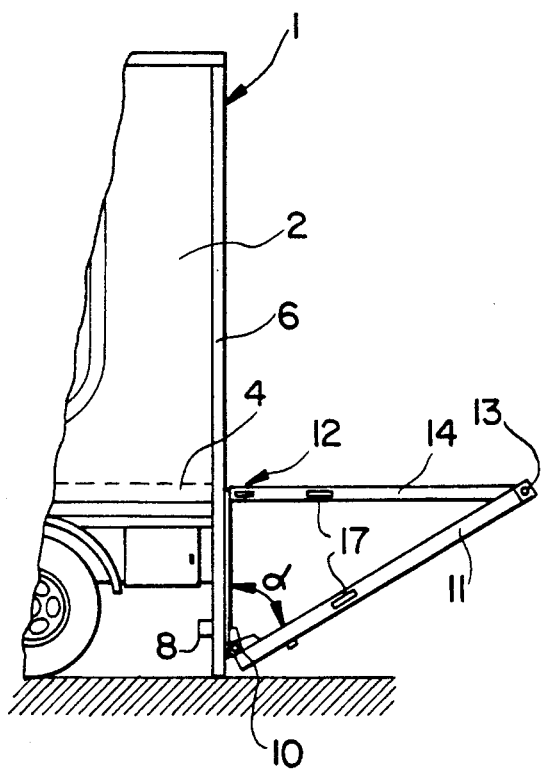
FIG. 4 shows a side view according to FIG. 3 with the device in the operative condition and with the carrying section in the position where cargo can be brought from the cargo space of the truck onto the carrying section or vice versa.
Figure 5:
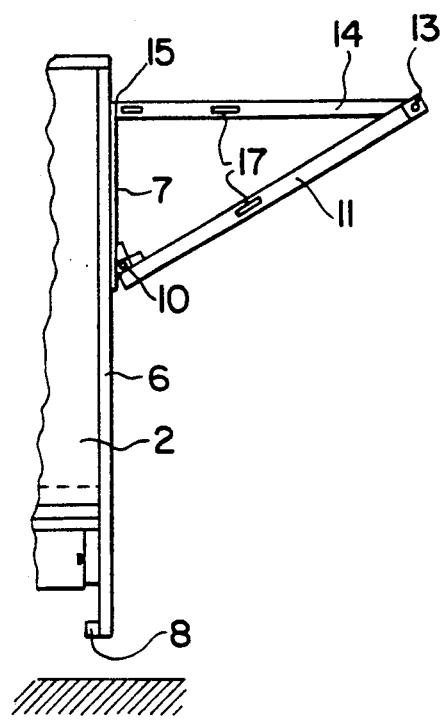
FIG. 5 shows a side view according to FIG. 4 but with the loading platform in the raised position.

In case of the embodiment according to the FIGS. 3-5, the base section 11 and the carrying section 14 are dimensioned such that the free edge 15 of the carrying section can be releasably connected to the upper edge of the slide 7 so that the carrying section can take the position as shown in FIGS. 4 and 5. The connection can be obtained by the use of some hooks which are received in lugs. This, however, is not shown in detail. The angle α between the slide 7 and the base section may be between 75° and 45°.

In FIG. 4, the slide 7 is in its lowest position and the carrying section 14 is positioned such that the supporting surface of it is substantially aligned with the supporting surface of the floor 4 of the truck 1. In this position a load can be brought from the floor 4 onto the carrying section 14 so that this load can be subsequently moved upwardly to the position shown in FIG. 5 and vice versa.

Figure 2:
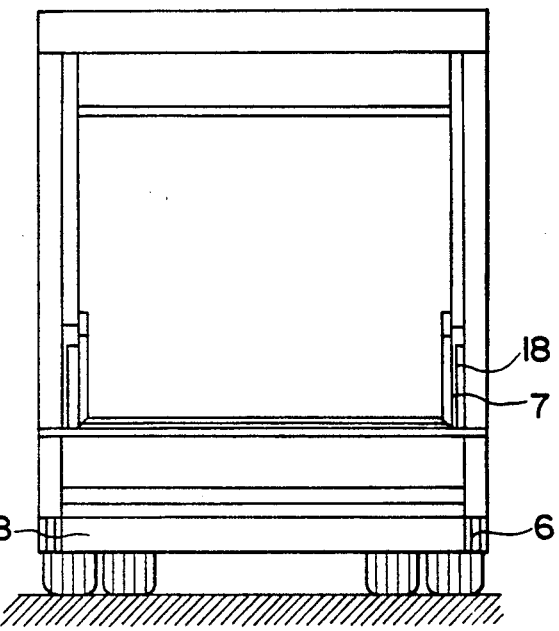
FIG. 2 shows a rear view of the truck of FIG. 1.

When the device is no longer to be used, the edge 15 will be released from the slide 7 and the carrying section 14 will be pivoted towards the base section 11, after which both sections will be locked by the means 17 which are not shown in detail. Then the platform assembly 12 can be brought in the position as shown in the FIGS. 1 and 2 either manually or by means of a pressurized medium cylinder 18 as indicated for example in FIG. 1. The cylinder is connected between the slide 7 and the base section 11.

Figure 6:
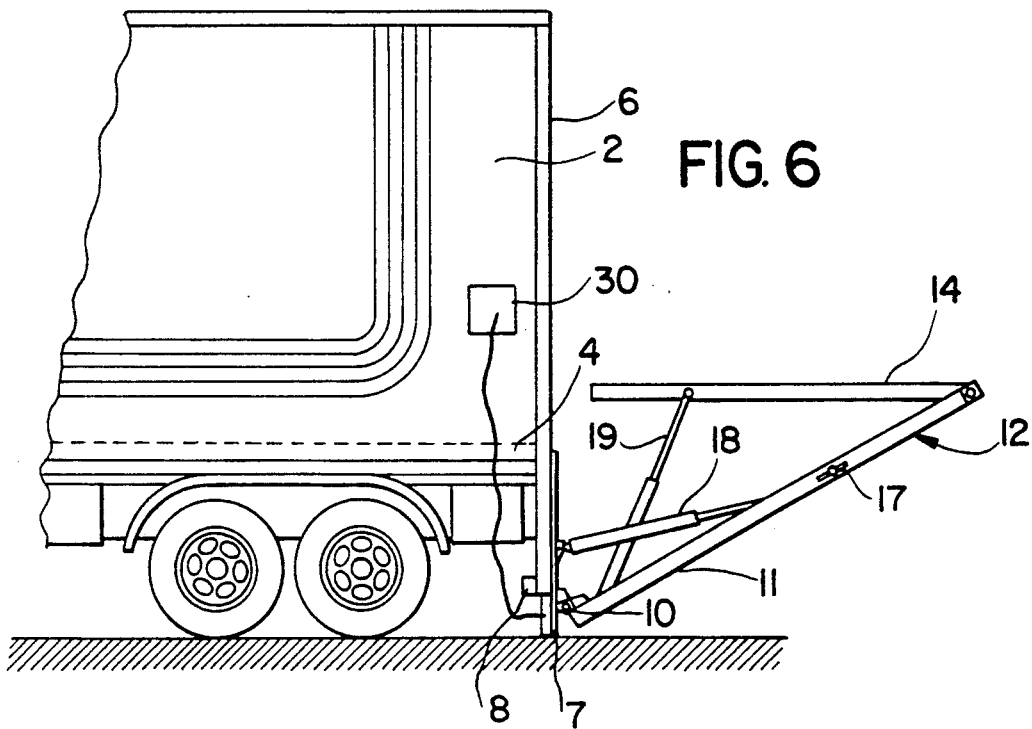
FIG. 6 shows a side view according to FIG. 1 of a second embodiment of a device according to the invention with the loading platform in an operative position and with the slide in the lowest position.
Figure 7:
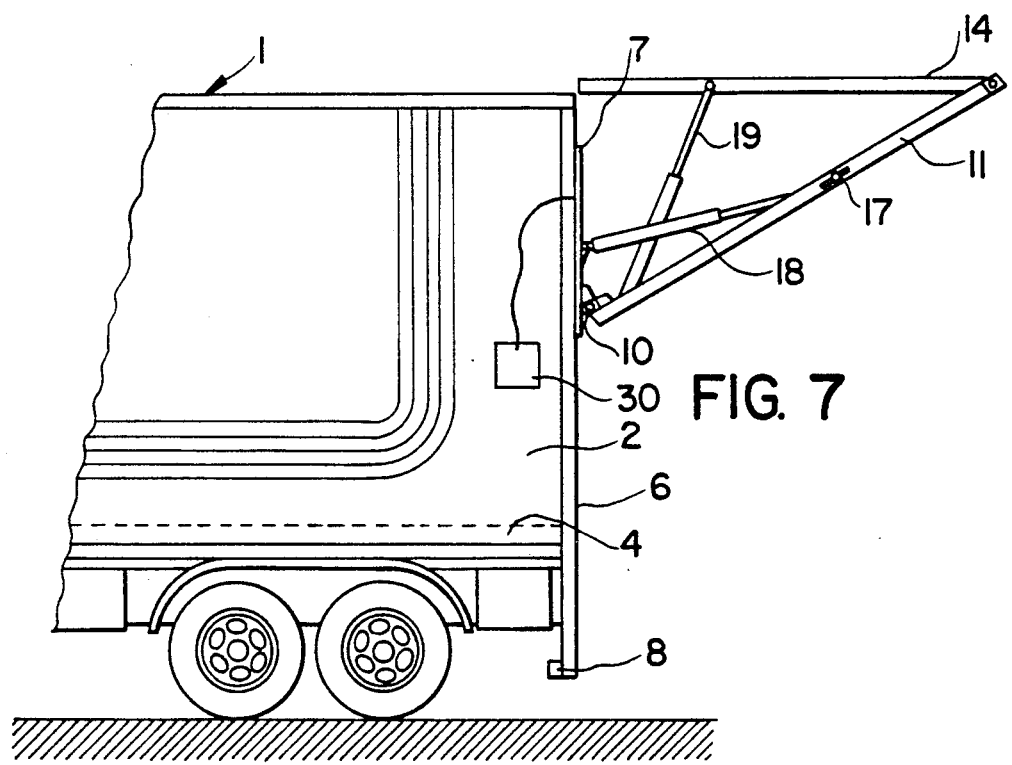
FIG. 7 shows a side view according to FIG. 6 but with the slide in a raised position.

The FIGS. 6-8 show an embodiment, comprising substantially the same parts as the embodiment according to FIGS. 3-5, with the similar parts being indicated with the same reference numbers.

However, in the case of the embodiment according to the FIGS. 6-8, a further pressurized medium cylinder 19 is present between the base section 11 and the carrying section 14 so that, as appears from FIG. 7, the supporting surface of the carrying section 14 can be brought further upwardly and even above the highest point of the body 2 of the truck 1. In this embodiment locking means may be present to lock the base section and carrying section with respect to the slide 7 in the position shown in the FIGS. 6 and 7. In addition, control means, not shown, can be used to ensure that the carrying section 14 always remains in a horizontal position when the load lifting device is used.

FIG. 9 shows an embodiment of the base section 11 and of the carrying section 14 in which the base section 11 has two beams 20 which extend from the pivot shaft 10 and which are connected with each other by means of a substantially plate-shaped element 21 extending over a limited portion of the length of the beams 20 only.

The carrying section 14 is dimensioned such that it fits between the beams 20 and extends from the pivot shaft 13 up to the plate-shaped element 21. In this way, the upper surfaces of the plate-shaped element 21 and the carrying section 14 are lying in one plane.

FIG. 10 shows another configuration in which the base section 11 extends below the carrying section 14 and is provided with a part 22 to obtain one continuous load-supporting surface.

Figure 11:
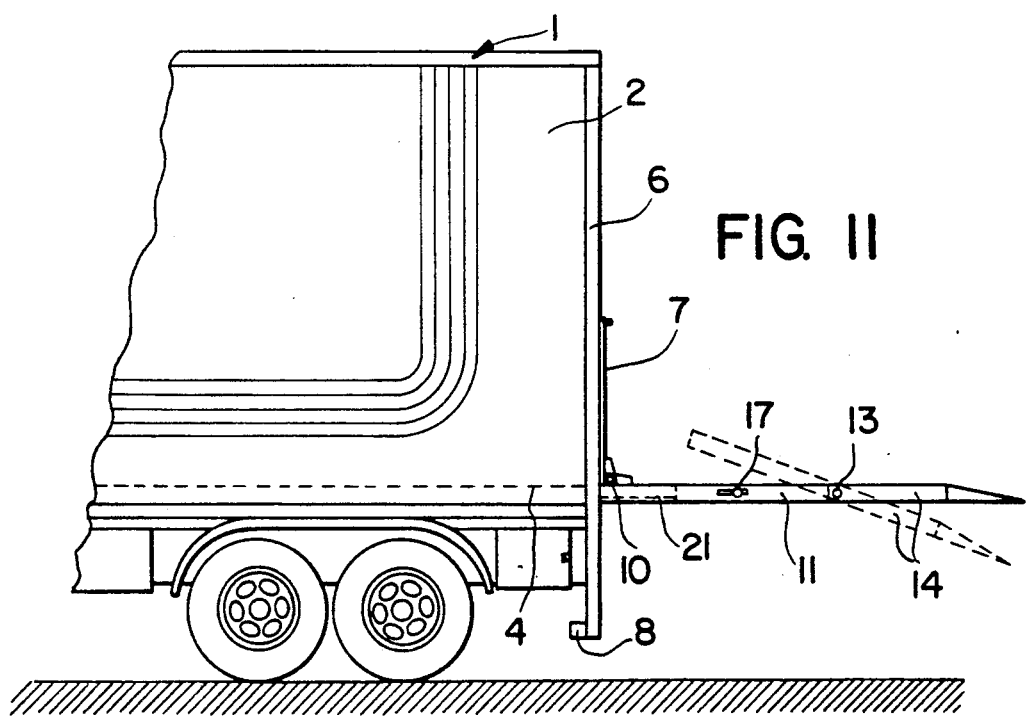
FIG. 11 shows a side view according to FIGS. 9 and 10 but reflections still another embodiment of the platform sections.

Finally FIG. 11 shows the carrying section 14 as extending beyond the pivot shaft 13, which in some instances might be useful when working with the device. Obviously, in this case, the carrying section can be mounted in the same way as indicated in FIG. 10, and many further modifications and combinations can be applied without departing from the spirit of the inventive concept.

We claim:

1. A load lifting device for a truck, comprising:
 a pair of substantially upright columns each having a top surface and being mounted stationary with respect to the truck;
 a slide being movably mounted to the columns;
 a platform assembly having a carrying section and a base section, the carrying section including a load bearing surface and a free end;
 means for raising the slide assembly relative to the columns; and
 means for adjusting the position of the carrying and base sections relative to the slide;
 wherein the base section is pivotably mounted to the slide about a first pivot axis and the carrying section is pivotally mounted to the base section about a second pivot axis;
 wherein when said slide is raised to a predetermined level, the carrying section is horizontally oriented located at the top surfaces of the columns.

2. A load lifting device according to claim 1, wherein when the carrying section load bearing surface is in the horizontal position, the free edge is releasably fixed to the slide.

3. A load lifting device according to claim 1, wherein the adjusting means positions the carrying section such that it is lying in the same plane as the base section, the base section includes two spaced beams extending perpendicular to the first and second pivot axes, and the beams are connected to each other by the slide.

4. A load lifting device according to claim 3, wherein the length of the carrying section is smaller than the length of the base section, and further comprising a plate shaped element which is provided between the beams for bridging a distance between the free edge of the carrying section and the slide.

5. A load lifting device according to claim 3, wherein the carrying section has a second free end and the second pivot axis is spaced from the first and second free ends such that the first and second free ends run parallel to the second pivot axis.

6. A load lifting device according to claim 3, further comprising means for pivoting the base section and the carrying section, the pivoting means including at least one of mechanically, pneumatically, hydraulically and electrically operated means.

7. A load lifting device according to claim 6, further comprising means for controlling the position of the carrying section such that the load bearing surface remains horizontal during pivoting of the base section.

8. A load lifting device according to claim 1, wherein when the carrying section is adjusted so that the load bearing surface is in a horizontal position relative to the slide, the base section projects upward from the slide to the carrying section at an oblique angle.

9. A load lifting device according to claim 8, wherein when said carrying section is adjusted so that the load bearing surface is in the horizontal position, the free end of the carrying section is proximate to the slide.

10. A load lifting device according to claim 9, wherein the oblique angle is between 45° and 75°.

11. A load lifting device according to claim 10, wherein said means for adjusting includes a first pressure cylinder connected to the base section and the carrying section for adjusting the position of the carrying and base sections relative to each other.

12. A load lifting device according to claim 10, wherein the means for adjusting further includes a second pressure cylinder being mounted between the slide device and the base section such that the position of the base section relative to the slide can be changed.

13. In combination with a truck body having a top surface, a load lifting device comprising:
a pair of vertical columns mounted to the truck body;
a slide being movably mounted to the columns;
a platform assembly having a base section and a carrying section, the base section being pivotally mounted to the slide and the carrying section, the carrying section having a load bearing surface thereon;
means for raising the slide assembly along the columns; and
means for adjusting the base and carrying sections, relative to the slide, from a stored position to a load carrying position, said means for adjusting including a first pressure cylinder mounted to the slide and the base section and a second pressure cylinder mounted to the base section and the carrying section;
wherein when the slide is raised to an upper position, and the base and carrying sections are in the load carrying position, the load bearing surface is substantially horizontal relative to the columns and substantially level relative to the top surface of the truck body, and the base section extends upwardly from the slide to the carrying section such that the slide and the base section form an obtuse angle therebetween.

* * * * *